(12) United States Patent
    Rangineni et al.

(10) Patent No.: US 12,696,341 B2
(45) Date of Patent: Jul. 28, 2026

(54) LE CONNECTED ISOCHRONOUS CHANNELS LATENCY IMPROVEMENTS

(71) Applicant: Cypress Semiconductor Corporation, San Jose, CA (US)

(72) Inventors: Balasubramanyam Rangineni, San Diego, CA (US); Rohit Gupta, New Delhi (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 285 days.

(21) Appl. No.: 18/510,989

(22) Filed: Nov. 16, 2023

(65) Prior Publication Data

US 2025/0168917 A1    May 22, 2025

(51) Int. Cl.
    *H04W 76/27* (2018.01)
    *H04W 84/18* (2009.01)

(52) U.S. Cl.
    CPC ............ *H04W 76/27* (2018.02); *H04W 84/18* (2013.01)

(58) Field of Classification Search
    CPC ... H04W 28/02; H04W 72/569; H04W 80/02; H04W 76/27; H04W 84/18; H04W 76/15; H04W 74/002; H04W 76/11; H04W 76/14; H04L 1/1854
    See application file for complete search history.

(56) References Cited

U.S. PATENT DOCUMENTS

| | | | | |
|---|---|---|---|---|
| 2023/0071138 A1* | 3/2023 | Cheong | | H04W 76/14 |
| 2023/0116736 A1* | 4/2023 | Jin | | H04W 92/18 |
| | | | | 370/329 |
| 2023/0164860 A1* | 5/2023 | Cheong | | H04W 72/56 |
| | | | | 370/328 |
| 2024/0023171 A1* | 1/2024 | Yang | | H04W 76/10 |
| 2024/0147392 A1* | 5/2024 | Linsky | | H04Q 9/04 |
| 2024/0251203 A1* | 7/2024 | Jin | | H04R 3/005 |
| 2024/0260102 A1* | 8/2024 | Stationwala | | H04W 76/15 |
| 2024/0276306 A1* | 8/2024 | Rachamadugu | | H04W 28/20 |
| 2024/0276537 A1* | 8/2024 | Rachamadugu | | H04W 28/02 |
| 2025/0048460 A1* | 2/2025 | Lee | | H04L 69/22 |
| 2025/0159449 A1* | 5/2025 | Sridhara | | H04W 28/02 |
| 2025/0203598 A1* | 6/2025 | Goyal | | H04W 72/0446 |
| 2025/0240116 A1* | 7/2025 | Cheong | | H04L 1/1825 |
| 2025/0240838 A1* | 7/2025 | Jang | | G06F 3/16 |
| 2025/0240839 A1* | 7/2025 | Ryu | | H04R 3/12 |
| 2025/0279840 A1* | 9/2025 | Jang | | H04W 4/06 |

* cited by examiner

*Primary Examiner* — Jung Liu

(57) ABSTRACT

Disclosed are techniques to temporarily deactivate or activate the ACL link associated with an isochronous link between a central and a peripheral device of a BLE piconet. The central and peripheral devices may agree to enter into an ACL parked mode after an isochronous link is established between the devices. In the parked mode, the ACL link is in a dormant state without any ACL events. If the central or the peripheral device wants to activate the ACL link to transmit one or more control or data packets, the device may use a CIS subevent on the isochronous link to transmit an LL control PDU. The LL control PDU may contain ACL timing information that specifies the timing of the future ACL event. The device may specify the ACL timing information to avoid or reduce chances of collisions of the future ACL event with CIS packets on the isochronous link.

20 Claims, 11 Drawing Sheets

FIG. 7

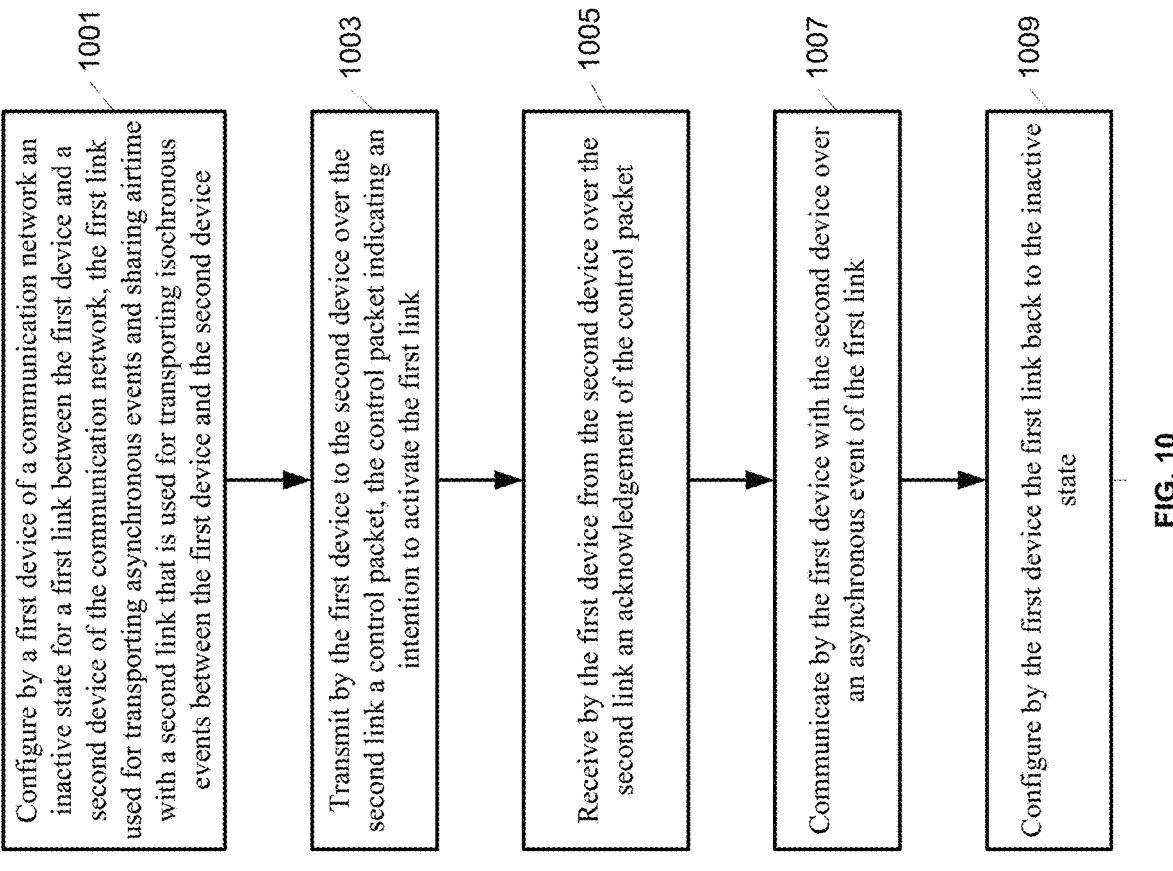

1000

Configure by a first device of a communication network an inactive state for a first link between the first device and a second device of the communication network, the first link used for transporting asynchronous events and sharing airtime with a second link that is used for transporting isochronous events between the first device and the second device — 1001

Transmit by the first device to the second device over the second link a control packet, the control packet indicating an intention to activate the first link — 1003

Receive by the first device from the second device over the second link an acknowledgement of the control packet — 1005

Communicate by the first device with the second device over an asynchronous event of the first link — 1007

Configure by the first device the first link back to the inactive state — 1009

FIG. 10

LE CONNECTED ISOCHRONOUS CHANNELS LATENCY IMPROVEMENTS

TECHNICAL FIELD

This disclosure generally relates to technologies for connecting devices based on narrow-band radios such as Bluetooth wireless technologies, and more particularly, to methods and systems for reducing over-the-air collisions and congestion in isochronous channels of a Bluetooth Low Energy (LE) network.

BACKGROUND

In a Bluetooth LE network, active devices on a piconet may use the asynchronous connection-oriented logical transport (ACL) for asynchronous user data and link layer protocol signaling. Using an ACL connection, a central device may establish one or more isochronous connections that use the isochronous physical channel. The central and peripheral devices may use the isochronous connections to transfer isochronous data at regular intervals using a logical transport referred to as a connected isochronous stream (CIS). A central device may establish one or more CISes with different peripherals as a part of a connected isochronous group (CIG). Thus, a piconet may include one or more ACL logical transports over the active physical link(s) (also known as ACL links) plus one or more CIS logical transports over the isochronous physical link(s). In some cases, the ACL link may only be used to transport control information of the ACL link or control information of the isochronous link. For example, the ACL link may be active only to maintain clock synchronization between the central and peripheral devices. Maintaining the ACL link to transport control information or other link layer protocol signaling may result in over-the-air (OTA) congestion and collisions between ACL and CIS events. It reduces the bandwidth available for the isochronous link, and degrades performance of applications such as LE audio streaming using the CIS logical transports. It is desirable to reduce OTA congestions and collision between ACL and isochronous links in BLE.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7 illustrates the resumption of periodic ACL events on the ACL link from the parked mode in which some of the periodic ACL events may collide with CIG packets on the isochronous link in accordance with one aspect of the present disclosure;

FIG. 10 illustrates a flow diagram of a method for a device in an isochronous link associated with a dormant ACL link to activate the ACL link from the dormant state for an ACL event with a specified timing in accordance with one aspect of the present disclosure;

DETAILED DESCRIPTION

Figure 1:
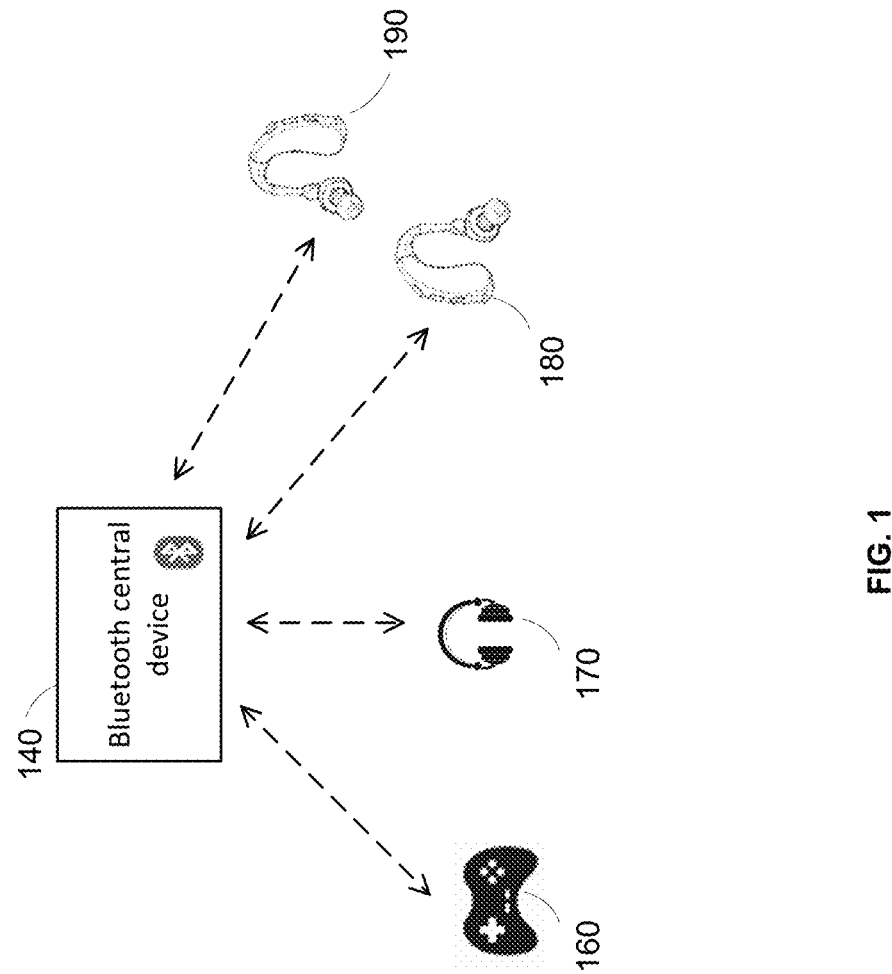
FIG. 1 depicts a scenario of several peripheral devices communicating with a central device of a BLE network in a piconet in which it is desirable to reduce collisions between ACL and isochronous events when the devices communicate using isochronous links in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

In Bluetooth LE (BLE), a central device plays the role of the master to control the timing and channels of communication with a connected peripheral device. After a pair of devices enter a connection state in the link layer, the central device may time-multiplex communication between the central and the connected peripheral device with that of other connected peripheral devices in a piconet. When a device joins a piconet, a primary connection-oriented logical transport (ACL) may be created for asynchronous user data transfer and link layer (LL) protocol signaling. ACL connection events are used to send data packets between the central and peripheral devices. For example, the central may use ACL events to transmit control signaling such as LL protocol signaling to control the operations of the peripherals in the piconet and to provide services to manage the lower level physical (PHY) and LL. Using an ACL connection (also referred to as an ACL link), a central device may also establish one or more isochronous connections (also referred to as isochronous links). The central and peripheral devices may use the isochronous connections to transfer isochronous data at regular intervals using the connected isochronous stream (CIS) logical transport.

BLE CIS is a point-to-point bidirectional communication protocol that allows a central device and a peripheral device to exchange data packets using connected isochronous protocol data units (PDUs). A CIS event may be divided into multiple sub-intervals known as subevents, which are reserved transmission/reception (TX/RX) periods on the isochronous physical channel, for a central device to communicate with a separate peripheral device in each sub-interval. At the beginning of every subevent, the central device transmits a packet to a peripheral device. A peripheral device may respond only when the central device has polled for it. Because an isochronous link is associated with an active ACL link, there may be over-the-air (OTA) congestion as a result of transmissions of CIS events/subevents on the isochronous link and ACL events on the ACL link. In some cases, the ACL link may only be used to transport control information of the ACL link or control information of the isochronous link. In some cases, the ACL link may be active only to maintain clock synchronization between the central and peripheral devices. When a collision occurs between a CIS event/subevent and an ACL event, the CIS event/subevent may yield to the ACL event, disrupting the isochronous channel transfer and degrading performance of applications using the CIS logical transport.

Disclosed are protocols to temporarily deactivate or activate the ACL link associated with an isochronous link between a central and a peripheral device of a BLE piconet. The central and peripheral devices may agree to enter into an ACL parked mode after an isochronous link is established between the devices. In the parked mode, the ACL link is deactivated or in a dormant state without any ACL events to maintain the link. The central and peripheral devices may assume timing synchronization on the ACL link based on synchronization events on the isochronous link. If the central or the peripheral device wants to activate the ACL link to transmit one or more control or data packets, the device may use a CIS subevent referred to as an LL control subevent on the associated isochronous link to transmit an LL control PDU. The LL control PDU may contain ACL timing information that specifies the timing of the future ACL event. The device may specify the ACL timing information to avoid or reduce chances of collisions of the future ACL event with future packets on the isochronous link.

In one aspect, the device may start a single ACL event at the specified timing on the ACL link to quickly exchange control information without fully resuming the ACL link. The device may return the ACL link to the parked mode to keep the ACL link in the dormant state. In one aspect, the device may restart periodic ACL events on the ACL link starting from the specified timing. Advantageously, either the central or the peripheral device may temporarily activate or deactivate the ACL link by transmitting LL control subevent on the isochronous link to avoid or reduce chances of collisions between CIS events/subevents and ACL events.

FIG. 1 depicts a scenario of several peripheral devices communicating with a central device 140 of a BLE network in a piconet in which it is desirable to reduce collisions between ACL and isochronous events when the devices communicate using isochronous links in accordance with one aspect of the present disclosure. The peripherals may include a gaming controller 160, a headphone 170, and a pair of hearing aid 180 and 190, one for each ear. The peripherals may be collectively referred to as human interface devices (HIDs). A host (not shown) connected to the central device 140 may run applications to act as a gaming console for the gaming controller 160, an audio streaming source for the headphone 170, or an interface controller for the hearing aid 180/190.

To provide a more immersive and responsive user experience, it is desirable that the isochronous links be capable of supporting short reporting intervals of 1 ms, 2 ms, 5 ms, 10 ms, 15 ms, and 20 ms from the peripherals depending on the number of peripherals connected to the central device 140. For example, the reporting interval may be 1 ms for a single peripheral, 2 ms for two peripherals, 4 ms for four peripherals, etc. It is also desirable to keep the communication latency (e.g., delay between when data is available for transmission and the actual time of transmission) from the peripheral devices to the central device 140 as low as possible. For the four peripherals, there may be up to 4 active ACL links and a CIG with up to 4 CIS events. Due to the demand for low reporting intervals and low communication latency, the CIG event interval may equally distribute the CIS subevents, leaving little or no airtime for other links.

In some applications, the ACL link may be used only to transmit LL protocol signaling for link control. In other applications such as for the hearing aid, when a user adjusts the volume, the hearing aid and the central device 140 may exchange volume control change requests and responses over the ACL link. Even though these ACL events may occur infrequently, the ACL link may nevertheless be kept alive most of the time, even without any data or control information transfer. With the isochronous link occupying almost 100% of the OTA resources, when there are ACL events, OTA congestion occurs and collisions between ACL events and CIS events/subevents are very likely.

Figure 2:
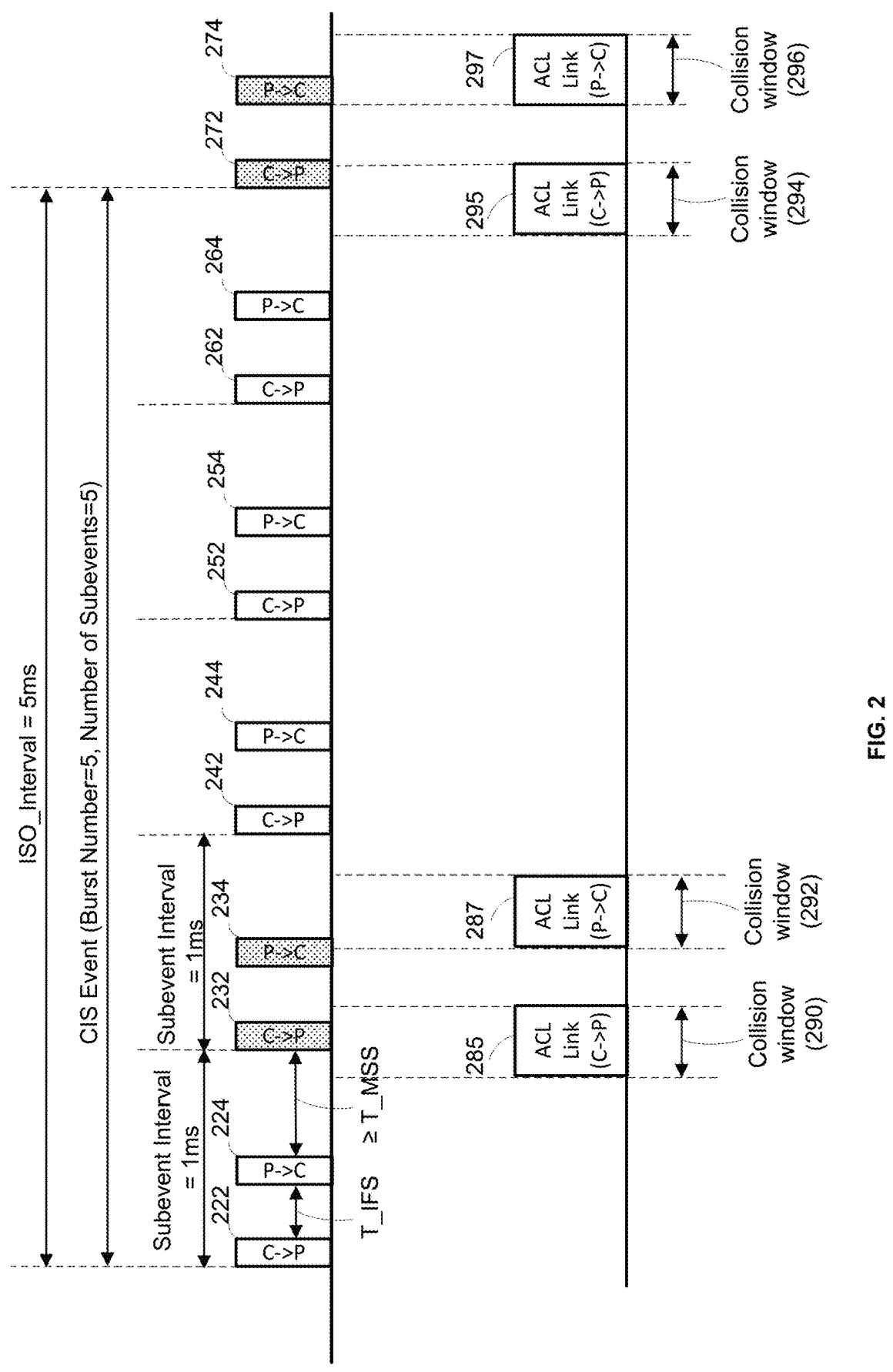
FIG. 2 illustrates collisions between CIS packets on the isochronous link and ACL events (e.g., LL signaling, user data, etc.) on the ACL link when the isochronous channel is associated with the active ACL link in a piconet in accordance with one aspect of the present disclosure.

FIG. 2 illustrates collisions between CIS packets on the isochronous link and ACL events (e.g., LL signaling, user data) on the ACL link when the isochronous channel is associated with the active ACL link in a piconet in accordance with one aspect of the present disclosure.

FIG. 2 shows one CIS event that is divided into 5 subevents. The period of the CIS event is 5 ms with a subevent interval of 1 ms. Multiple CIS events may form a CIG. Each CIS event may support bidirectional point-to-point logical transport between the central device and a peripheral. Multiple CISes in a CIG may have a common timing reference based on the central timing and are synchronized in time. CIS events support a variable flushing period for payload, variable packet size, and a variable number of subevents, allowing a range of isochronous data rates, latencies, and re-transmissions. A CIS packet may be retransmitted until an acknowledgement is received or until the packet is flushed at the end of the flushing period.

In any subevent, the central device may transmit a packet to the peripheral and the peripheral may respond with a packet of its own. The central device may time align its transmission with the start of every subevent. FIG. 2 shows the central transmitting C→P CIS packets 222, 232, 242, 252, 262 at the start of each of the 5 subevents of the current CIS event, respectively, and transmitting C→P CIS packet 272 at the start of the first subevent of the next CIS event. The peripheral may transmit a packet after a gap of inter-frame spacing (T_IFS) from the end of the central transmission. The T_IFS may be a minimum of 150 µs. FIG. 2 shows the peripheral transmitting P→C CIS packets 224, 234, 244, 254, 264, 274, respectively, in response to the C→P CIS packets in the subevents. There is a gap of a minimum subevent spacing (T_MSS) between the end of the P→C CIS packet in one subevent and the start of the C→P CIS packet in the next subevent. The T_MSS may be a minimum of 150 µs.

On the ACL link associated with the isochronous link, the central device may transmit C→P ACL packets 285, 295 to the peripheral. The C→P ACL packets 285, 295 may be LL signaling events that transport control information of the ACL link or control information of the isochronous link, such as information used to maintain clock synchronization between the central device and the peripheral. In some applications, the C→P ACL packets 285, 295 may include application layer data (e.g., ACL data packets). The peripheral may transmit P→C ACL packets 287, 297 to the central device in response to the C→P ACL packets 285, 295. In some applications, the P→C ACL packets 287, 297 may have its own application layer data such as volume control change requests when a user adjusts the volume of a hearing aid device.

The ACL packets may collide with the CIS packets. Collision windows 290, 294, 292, 296 may define the timing of transmissions of the C→P ACL packets 285, 295, and P→C ACL packets 287, 297, respectively. When a collision window overlaps with a CIS packet, a collision occurs. For example, collisions may occur between C→P ACL packet 285 and C→P CIS packet 232; between P→C ACL packet 287 and P→C CIS packet 234; between C→P ACL packet 295 and C→P CIS packet 272; and between P→C ACL packet 297 and P→C CIS packet 274. In one scenario, the CIS event may yield to the ACL event. In one scenario, either or both of the colliding packets may be received incorrectly. The result is a disruption of the isochronous channel transfer and degradation of the performance of applications using the CIS logical transport.

To reduce the chance of collisions between the packets of the ACL and isochronous links, when two devices have established an isochronous link, both devices may enter a parked mode for the ACL link to temporarily deactivate the ACL link. In the parked mode, the ACL link is in a dormant state without any ACL events. Either device may transmit an LL control subevent on the isochronous link to temporarily activate the ACL link for one or more ACL events. The LL control subevent may contain timing information to specify the timing of one or more future ACL events on the activated ACL link.

Figure 3:
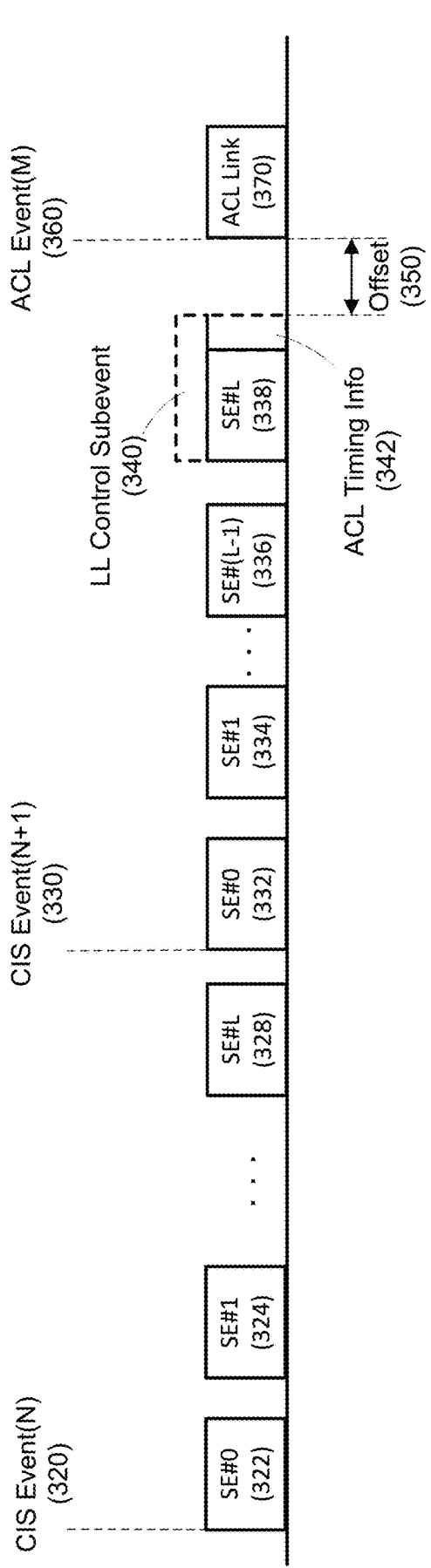
FIG. 3 illustrates a parked mode of the ACL link in which the ACL link is parked in a dormant state without any active communication and a device sends a link layer control PDU during a link layer control subevent on the connected isochronous link with ACL timing information to activate the ACL link in accordance with one aspect of the present disclosure.

FIG. 3 illustrates a parked mode of the ACL link in which the ACL link is parked in a dormant state without any active communication and a device sends a link layer control PDU during a link layer control subevent on the connected isochronous link with ACL timing information to activate the ACL link in accordance with one aspect of the present disclosure.

When a central device and a peripheral device establish an isochronous link for CIS logical transport, both devices may agree to temporarily park the ACL link associated with the isochronous link. In the parked mode, both devices keep the ACL link in the dormant state without any active communication to maintain the link. The ACL and isochronous links may share a common clock reference. By maintaining time synchronization between the central and peripheral devices based on the CIS events/subevents, the devices may assume timing synchronization on the ACL link. When the central device or the peripheral wants to transmit control information or data packets from the application layer via the ACL link, the device may transmit an LL control PDU containing ACL timing information during the LL control subevent to the other device. In one embodiment, the timing information may specify an offset of a future ACL event from the end of the LL control subevent. In one embodiment, the timing information may specify an ACL event counter from which the two devices may determine the timing of the future ACL event.

FIG. 3 shows uninterrupted CIS events on the isochronous link when the associated ACL link is in the parked mode. The central and peripheral devices may use CIS event N (320) to exchange CIS packets during (L+1) subevents 322, 324, . . . 328 and CIS events N (330) to exchange CIS packets during (L+1) subevents 332, 334, 336, . . . 338. When a device, referred to as the requesting device, wants to transmit an ACL packet, the requesting device may transmit a LL control PDU during a CIS subevent, such as during subevent L 338. This subevent may also be referred to as an LL control subevent 340. The LL control subevent 340 may contain ACL timing information 342. The ACL timing information 342 may indicate to the other device, referred to as the responding device, that the requesting device wishes to activate the ACL link 370 to start the ACL event M 360 at an offset 350 from the end of the LL control subevent 340. The requesting device may determine the offset 350 to avoid a collision of the ACL event M 360 with any expected CIS packet.

The responding device may respond with an acknowledgement of the LL control PDU. When the requesting device receives the acknowledgement from the responding device during the LL control subevent 340 or in a subsequent CIS subevent, the requesting device may transmit an ACL packet containing control signaling or application layer data to the responding device on the activated ACL link 370 during the ACL event M 360 as specified by the offset 350. In one embodiment, the ACL event M 360 may be a single ACL event during which the requesting and responding devices may exchange ACL packets. At the conclusion of the ACL event M 360, the two devices may automatically revert back to the parked mode to keep the ACL link in the dormant state. In one embodiment, the ACL event M 360 may be the start of periodic ACL events on the ACL link when there are multiple ACL packets to transmit. In one embodiment, after transmitting multiple ACL packets using the periodic ACL events, the requesting device may transmit a LL control PDU to indicate to the responding device that the requesting device wishes to revert back to the parked mode. Thus, from the parked mode, the central or the peripheral may only activate the ACL link long enough to exchange control information or data when needed.

Figure 4:
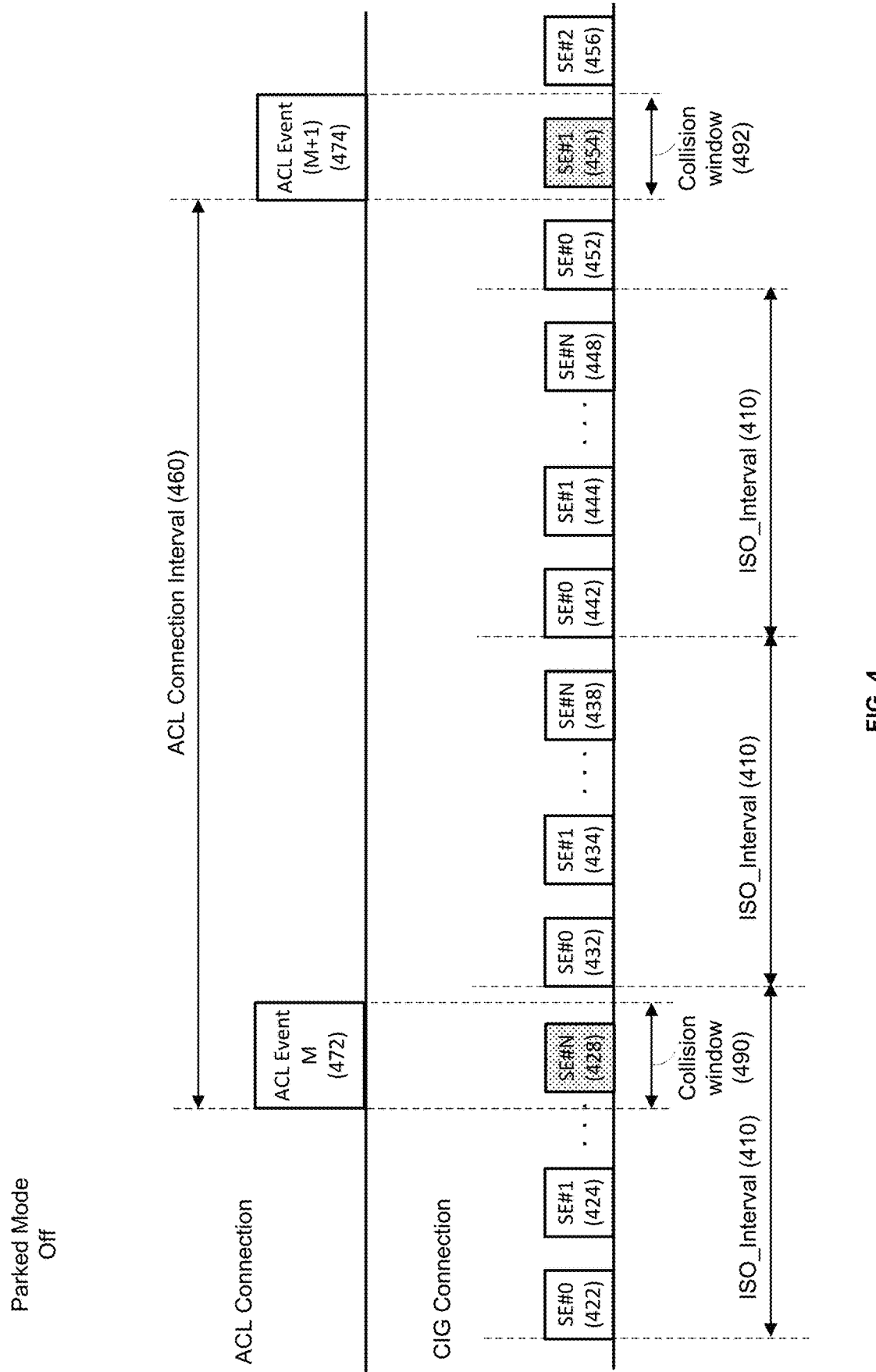
FIG. 4 illustrates devices in a piconet dropping CIG packets on the isochronous link when the CIG packets collide with ACL events on the ACL link that is not parked in a dormant state in accordance with one aspect of the present disclosure.

FIG. 4 illustrates devices in a piconet dropping CIG packets on the isochronous link when the CIG packets collide with ACL events on the ACL link that is not parked in a dormant state in accordance with one aspect of the present disclosure.

The ACL link is active with scheduled ACL event M 472 and ACL event (M+1) 474. The ACL events may be periodic with a periodicity indicated by the ACL connection interval 460. The central and a peripheral may exchange ACL packets during the ACL events. Collision windows 490 and 492 may define the timing of the ACL event M 472 and ACL event (M+1) 474, respectively.

On the isochronous link associated with the ACL link, CIS events form a CIG to support bi-directional logical transport between the central device and multiple peripherals. Each CIS event has an interval of ISO_interval 410 and is divided into (N+1) subevents. During each of the subevents such as 422, 424, . . . 428 of the first CIS events, subevents 432, 434, . . . 438 of the second CIS event, subevents 442, 444, . . . 448 of the third CIS event, and subevents 452, 454, 456 of the fourth CIS event, the central device and a peripheral may exchange CIS packets. Collision between a CIS packet and an ACL packet may occur when a CIS subevent overlaps with a collision window. When a collision occurs, ACL events may have higher priority, causing the CIS packet to yield to the ACL packet. For example, a receiving device may drop CIS packets in CIS subevent 428 in favor of ACL packets in ACL event M 472; the device may also drop CIS packets in CIS subevent 454 in favor of ACL packets in ACL event (M+1) 474. A transmitting device may retransmit a dropped CIS packet until an acknowledgement signal is received from the receiving device or until the expiration of the flushing period, but retransmissions of dropped CIS packets incur a penalty of increased communication latency and wasted channel resources.

Figure 5:
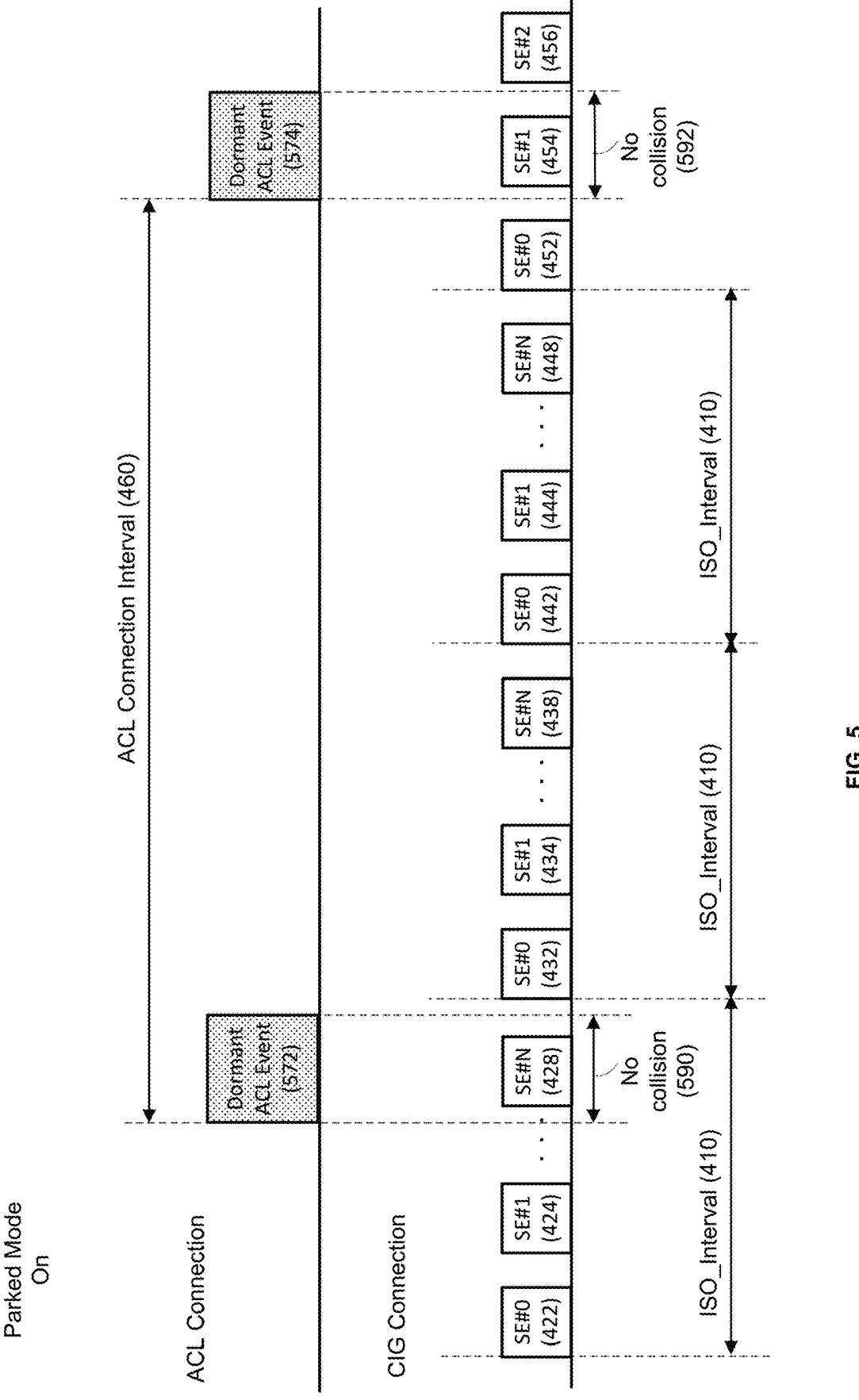
FIG. 5 illustrates the uninterrupted stream of CIG packets on the isochronous link when the ACL link is parked in a dormant state in accordance with one aspect of the present disclosure.

FIG. 5 illustrates the uninterrupted stream of CIG packets on the isochronous link when the ACL link is parked in a dormant state in accordance with one aspect of the present disclosure. FIG. 5 shows similar CIS event timing relative to the scheduled ACL events of FIG. 4 except that the scheduled ACL events are now dormant when the ACL link is placed in the parked mode. As result, the dormant ACL event M 572 does not collide 590 with CIS packets in CIS subevent 428; and dormant ACL event (M+1) 574 does not collide 592 with CIS packets in CIS subevent 454.

When a device has an ACL packet to transmit, the device may determine a suitable gap between the CIS subevents to schedule an ACL event to avoid any collision. The device may communicate to the other device timing information of the scheduled ACL event. The device may then activate the ACL link to transmit the ACL packet during the scheduled ACL event. To provide flexibility, the device may activate the ACL link to schedule a single ACL event or multiple ACL events using different sub-modes of the parked mode.

Figure 6:
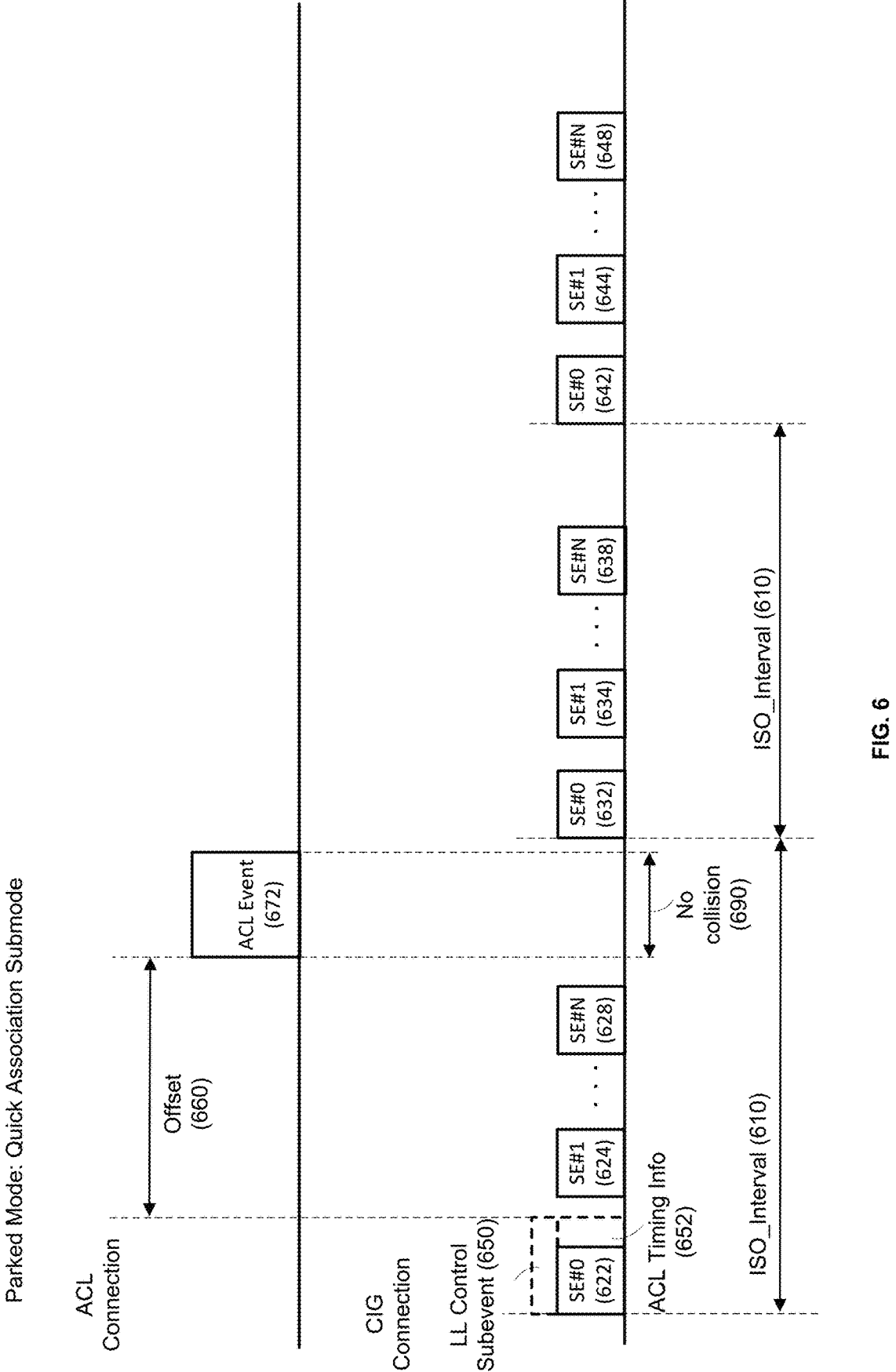
FIG. 6 illustrates the activation of a single ACL event on the ACL link from the parked mode in which the timing of the ACL event is specified with respect to a CIS subevent to avoid collisions with CIG packets on the isochronous link in accordance with one aspect of the present disclosure.

FIG. 6 illustrates the activation of a single ACL event on the ACL link from the parked mode in which the timing of the ACL event is specified with respect to a CIS subevent to avoid collisions with CIG packets on the isochronous link in accordance with one aspect of the present disclosure.

The ACL link is initially parked in the dormant state. Two devices of an isochronous link may pre-arrange or negotiate to be in a sub-mode of the ACL parked mode from which the ACL link may be activated for one ACL event when needed. This sub-mode may be called the quick association sub-mode in which the devices may exchange control or data information over the ACL link without resuming the periodic ACL events. As shown, the central and peripheral devices may exchange CIS packets over the isochronous link during subevents 622, 624, . . . 628 of a first CIS events, subevents 632, 634, . . . 638 of a second CIS event, subevents 642, 644, . . . 648 of a third CIS event, etc. The CIS events may have a periodicity of ISO_Interval 610. When a requesting device wants to transmit an ACL packet, it may determine a gap 690 in the CIS events during which to schedule an ACL event 672 to avoid a collision between the scheduled ACL event 672 and any CIS subevents. The requesting device may either be the central device or the peripheral device. The other device is called the responding device to distinguish it from the requesting device.

The requesting device may transmit an LL control PDU during LL control subevent 650 (e.g., during subevent 622) to indicate to the responding device that the requesting device wants to activate the ACL link and to indicate the timing of the scheduled ACL event 672. The LL control PDU may contain ACL timing information 652. In one embodiment, the ACL timing information 652 may specify an offset 660 of the scheduled ACL event 672 from the end of the LL control subevent 650. In one embodiment, the ACL timing information 652 may specify an ACL event counter that may be used by the responding device to infer the timing of the scheduled ACL event 672.

When the responding device receives the LL control PDU, the responding device may transmit an acknowledgement to the requesting device. For example, when the central device as the requesting device transmits the LL control PDU, the peripheral may transmit an acknowledgement during the LL control subevent 650 or in a subsequent subevent. When the requesting device receives the acknowledgement from the responding device, the requesting device may initiate the single ACL event 672 at the specified offset 660 to exchange ACL packets with the responding device. In one embodiment, the requesting device may initiate more than one ACL event without resuming the periodic ACL events. At the conclusion of the single ACL event 672 or multiple ACL events if any, the two devices may automatically return to the parked mode under the quick association sub-mode to put the ACL link back into the dormant state.

If the responding device fails to receive the LL control PDU during the LL control subevent 650, the responding device may transmit a non-acknowledgement indication to the requesting device. The requesting device may keep retransmitting the LL control PDU until it receives the acknowledgement from the responding device indicating that the LL control PDU was successfully received. Thus, unlike the CIS packets of the isochronous link, the LL control PDU is not flushed at the end of the flushing period when the LL control PDU has not been successfully received. To accomplish this, in one embodiment, when the two devices synchronize their Tx/Rx packet counters by updating the counters at the end of every flushing period, the devices may not flush any incorrectly received LL control PDU. This ensures that the scheduled ACL event starts only when the responding device has received the LL control PDU. In one embodiment, after the ACL link is activated, through the ACL event, the peripheral may time synchronize the ACL link with the central device, rather than relying on time synchronization of the ACL link based on CIS events.

Figure 7:
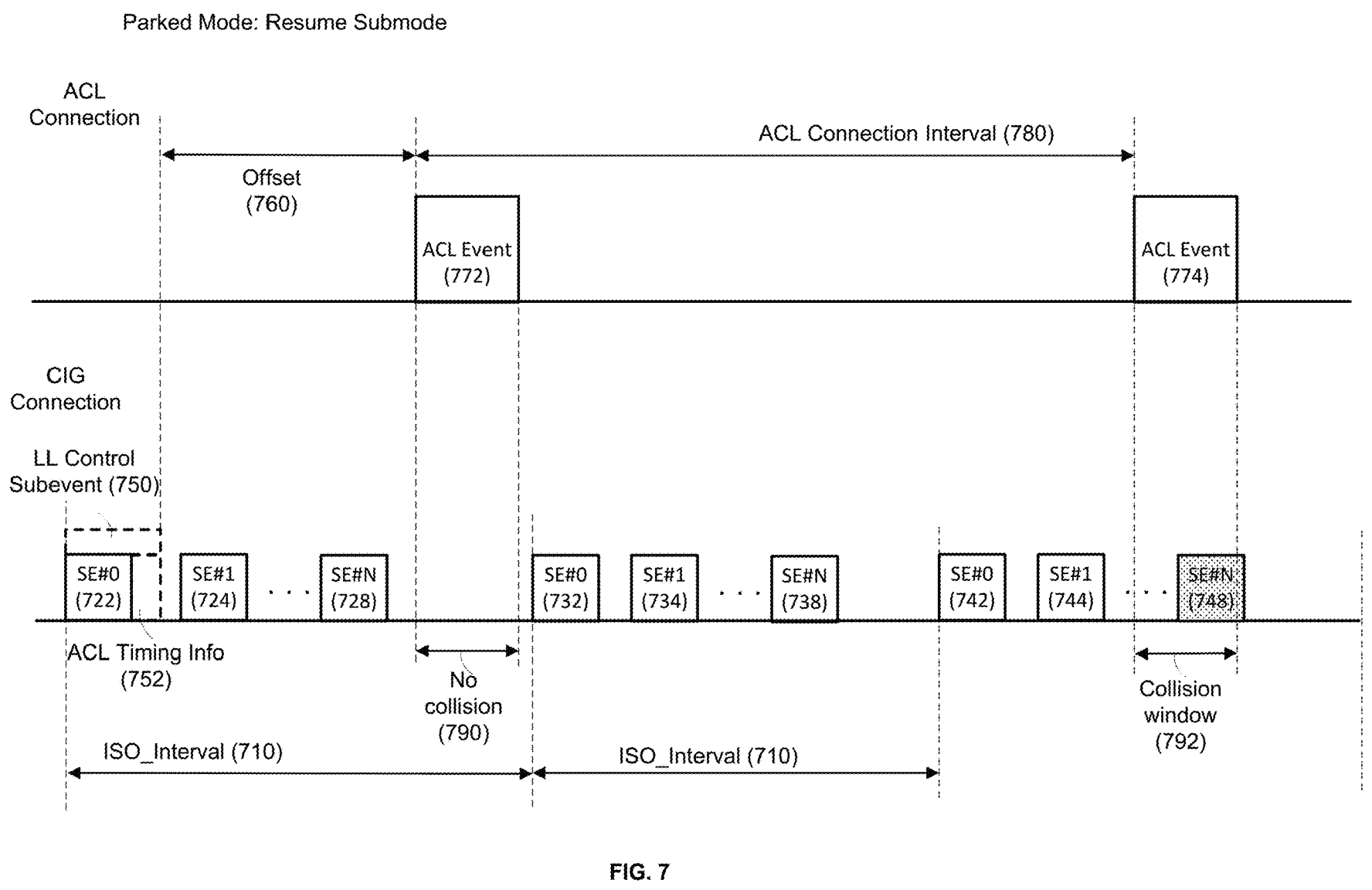

FIG. 7 illustrates the resumption of periodic ACL events on the ACL link from the parked mode in which some of the periodic ACL events may collide with CIG packets on the isochronous link in accordance with one aspect of the present disclosure.

Two devices of an isochronous link may pre-arrange or negotiate to be in a sub-mode of the ACL parked mode from which the ACL link may be activated to resume periodic ACL events. This sub-mode may be called the resume sub-mode in which the devices may exchange control or data information over multiple periodic ACL events until either device requests a return of the ACL link to the parked mode. As shown, the central and peripheral devices may exchange CIS packets over the isochronous link during subevents 722, 724, . . . 728 of a first CIS events, subevents 732, 734, . . . 738 of a second CIS event, subevents 742, 744, . . . 748 of a third CIS event, etc. The CIS events may have a periodicity of ISO_Interval 710.

When a requesting device wants to transmit ACL packets over multiple ACL events, it may determine a gap 790 in the CIS events during which to schedule a first ACL event 772 to avoid a collision between the first scheduled ACL event 772 and any CIS subevents. The requesting device may transmit an LL control PDU during LL control subevent 750 (e.g., during subevent 722) to indicate to the responding device that the requesting device wants to activate the ACL link to resume periodic ACL events and to indicate the timing of the first scheduled ACL event 772. In one embodiment, the LL control PDU may indicate whether the requesting device wants to activate the ACL link to exchange periodic ACL events or a single ACL event. The LL control PDU may contain ACL timing information 752. In one embodiment, the ACL timing information 752 may specify an offset 760 of the first scheduled ACL event 772 from the end of the LL control subevent 750. In one embodiment, the ACL timing information 752 may specify an ACL event counter that may be used by the responding device to infer the timing of the first scheduled ACL event 772.

When the responding device receives the LL control PDU, the responding device may transmit an acknowledgement to the requesting device. When the requesting device receives the acknowledgement from the responding device, the requesting device may resume periodic ACL events by scheduling the first ACL event 772 at the specified offset 760. As in the quick association sub-mode, if the requesting device fails to receive the acknowledgement from the responding device, the requesting device may retransmit the LL control PDU until the acknowledgement is received.

The periodic ACL events may have a periodicity of ACL connection interval 780 such that the second scheduled ACL event 774 may be offset from the first scheduled ACL event 772 by the ACL connection interval 780. A collision window 792 may define the timing of the second scheduled ACL event 774. When the collision window 792 overlaps with CIS subevent 748, collisions between packets of the ACL event 774 and the CIS subevent 748 may cause the CIS packet or the ACL packet to be dropped. In one embodiment, the transmitting device of the dropped packet, which may be the requesting device or the responding device, may retransmit the dropped CIS or ACL packet until an acknowledgement signal is received from the receiving device or until the expiration of the flushing period.

To return the ACL link to the parked mode, a first device, which may be the requesting device or the responding device, may transmit a second LL control PDU during a CIS subevent to indicate an intention to put the ACL link back into the dormant state. The other device may transmit an acknowledgement of the second LL control PDU. Upon receiving the acknowledgement of the second LL control PDU, the first device may deactivate the ACL link before the start of the next ACL event and may return the ACL link to the parked mode so that the ACL link when activated again will operate under the resume sub-mode. In one embodiment, the devices may prearrange or negotiate to enter into the parked mode after deactivating the periodic ACL events so that the ACL link when activated again will operate under the quick association sub-mode.

Figure 8:
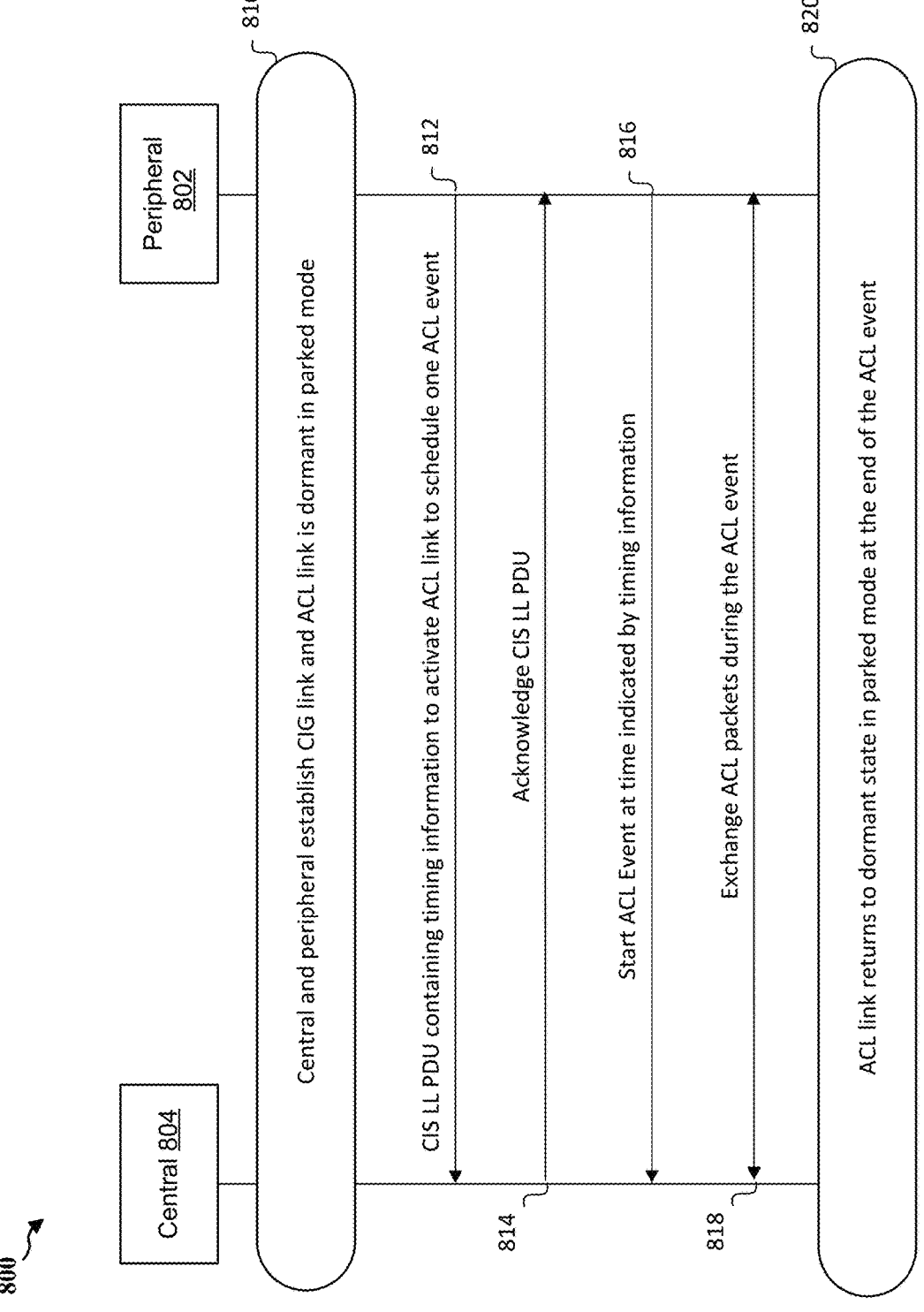
FIG. 8 illustrates a signal flow diagram between a central device and a peripheral device of an isochronous link with the ACL link parked in the quick association sub-mode from which the peripheral device requests the activation of a single ACL event on the ACL link to transfer a packet from the peripheral device to the central device in accordance with one aspect of the present disclosure.

FIG. 8 illustrates a signal flow diagram between a central device 804 and a peripheral device 802 of an isochronous link with the ACL link parked in the quick association sub-mode from which the peripheral device 802 requests the activation of a single ACL event on the ACL link to transfer a packet from the peripheral device 802 to the central device 804 in accordance with one aspect of the present disclosure In operation 810, starting from the ACL link, the central device 804 and the peripheral device 802 may establish an isochronous link for CIS logical transport. Upon establishing the isochronous link, both devices may agree to park the ACL link in the quick association sub-mode. In the parked mode, both devices may keep the ACL link in the dormant state without any active ACL events to maintain the ACL link. The peripheral device 802 may maintain time synchronization with the central device 804 on the isochronous link based on the CIS events, and by relying on a common clock reference for the ACL and isochronous links, the devices may assume timing synchronization on the ACL link.

In operation 812, the peripheral device 802 may transmit a CIS LL PDU containing timing information to indicate to the central device 804 an intention to activate the ACL link to schedule one ACL event. The peripheral device 802 may transmit the CIS LL PDU in a CIS event referred to as a LL control subevent. In one embodiment, the timing information may specify an offset of the scheduled ACL event from the end of the LL control subevent. In one embodiment, the peripheral device 802 may schedule the ACL event during a gap in the CIS events to avoid an overlap between the ACL event and any CIS event.

In operation 814, the central device 804 may transmit to the peripheral device 802 an acknowledgement of the CIS LL PDU via a CIS event. In one embodiment, if the CIS LL PDU is not correctly received, the central device 804 may transmit to the peripheral device 802 a non-acknowledgement indication via a CIS event. In this case, the peripheral device 802 may retransmit the CIS LL PDU until an acknowledgement is received from the central device 804.

In operation 816, the peripheral device 802 may initiate the ACL event on the ACL link at the time indicated by the timing information in the CIS LL PDU. The peripheral device 802 may transmit an ACL packet to the central device 804 and the central device 804 may respond with an acknowledgement ACL packet to the peripheral device 802.

In operation 818, the peripheral device 802 and the central device 804 may exchange ACL packets during the ACL event. In one embodiment, because the peripheral device 802 has scheduled the ACL event to avoid overlapping with any CIS event, there may not be collisions between the ACL packets and CIS packets.

In operation 820, the peripheral device 802 and the central device 804 may return the ACL link to the quick association sub-mode of the parked mode. The ACL link may remain dormant until it's activated by either device.

Figure 9:
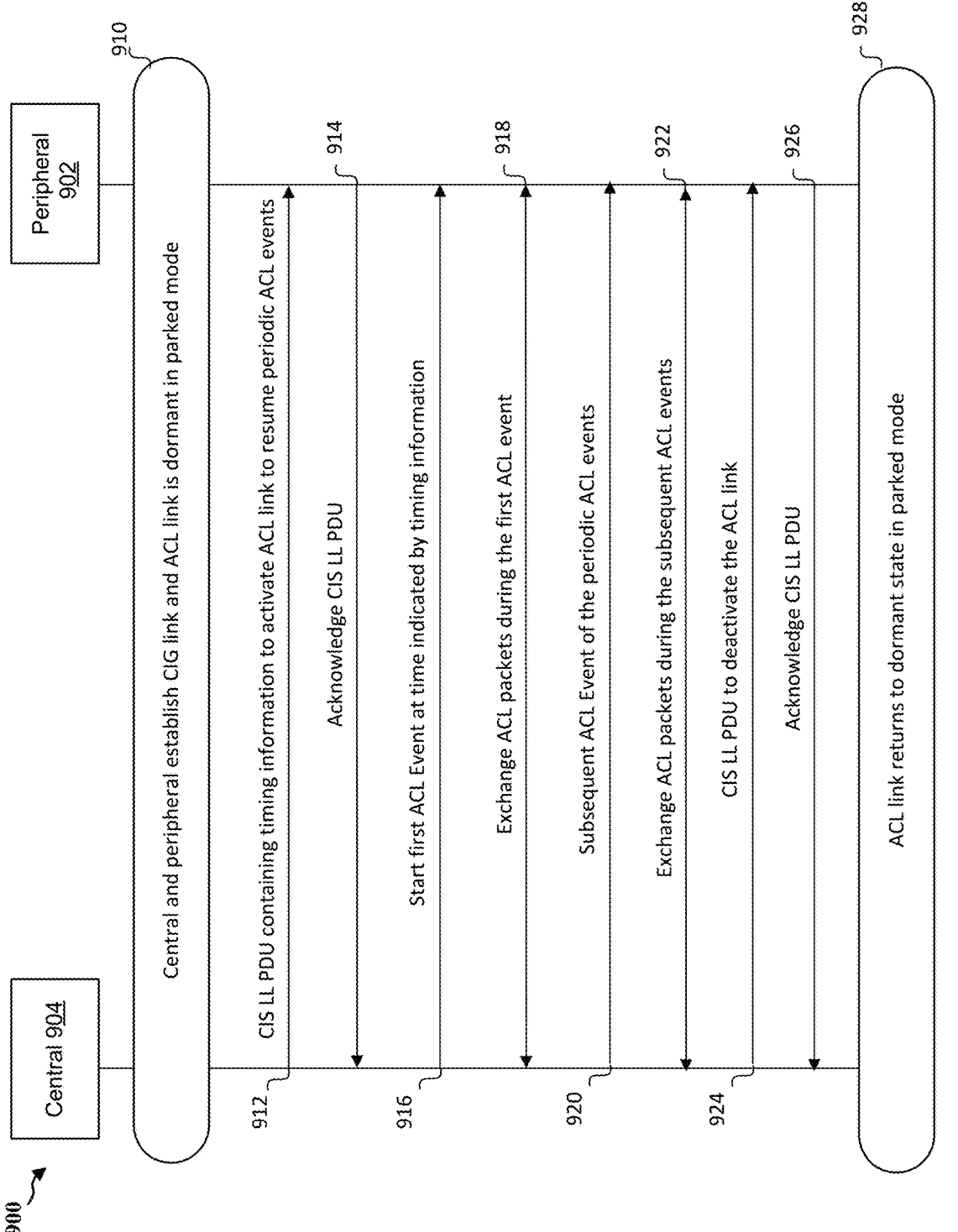
FIG. 9 illustrates a signal flow diagram between a central device and a peripheral device of an isochronous link with the ACL link parked in the resume sub-mode from which the central device requests the resumption of periodic ACL events on the ACL link to transfer periodic link layer signaling or data from the central device to the peripheral device in accordance with one aspect of the present disclosure.

FIG. 9 illustrates a signal flow diagram 900 between a central device 904 and a peripheral device 902 of an isochronous link with the ACL link parked in the resume sub-mode from which the central device 904 requests the resumption of periodic ACL events on the ACL link to transfer periodic link layer signaling or data from the central device 904 to the peripheral device 902 in accordance with one aspect of the present disclosure.

In operation 910, starting from the ACL link, the central device 904 and the peripheral device 902 may establish an isochronous link for CIS logical transport. Upon establishing the isochronous link, both devices may agree to park the ACL link in the resume sub-mode to keep the ACL link in the dormant state. As in the quick association sub-mode, the peripheral device 902 may maintain time synchronization with the central device 904 on the isochronous link based on the CIS events, and by relying on a common clock reference for the ACL and isochronous links, the devices may assume timing synchronization on the ACL link.

In operation 912, the central device 904 may transmit a CIS LL PDU containing timing information to indicate to the central device 902 an intention to activate the ACL link to resume periodic ACL events. The central device 904 may transmit the CIS LL PDU in a CIS event referred to as a LL control subevent. In one embodiment, the timing information may specify an offset of the first ACL event from the end of the LL control subevent. In one embodiment, the peripheral device 802 may schedule the first ACL event during a gap in the CIS events to avoid an overlap between the first ACL event and any CIS event.

In operation 914, the peripheral device 902 may transmit to the central device 904 an acknowledgement of the CIS LL PDU via a CIS event. In one embodiment, if the CIS LL PDU is not correctly received, the peripheral device 902 may transmit to the central device 904 a non-acknowledgement indication via a CIS event. In this case, the central device 904 may retransmit the CIS LL PDU until an acknowledgement is received from the peripheral device 902.

In operation 916, the central device 904 may initiate the first ACL event of the periodic ACL events on the ACL link at the time indicated by the timing information in the CIS LL PDU. The central device 904 may transmit to the peripheral device 902, during the periodic ACL events, LL control signaling that transports control information of the ACL link, ACL data packets, and/or control information of the isochronous link.

In operation 918, the central device 904 and the peripheral device 902 may exchange ACL packets during the first ACL event. The ACL packets may include application layer data. In one embodiment, because the central device 904 has scheduled the first ACL event to avoid overlapping with any CIS event, there may not be collisions between the ACL packets and CIS packets.

In operation 920, the central device 904 may initiate additional ACL events of the periodic ACL events. The periodic ACL events may have a periodicity that is prearranged, negotiated between the devices, or specified as part of the timing information in the CIS LL PDU.

In operation 922, the central device 904 and the peripheral device 902 may exchange ACL packets during the additional ACL events. In one embodiment, because the central device 902 has not scheduled the additional ACL events to avoid overlapping with any CIS event, there may be collisions between the ACL packets and CIS packets during the additional ACL events.

In operation 924, the central device 904 may transmit to the peripheral device 902 a second CIS LL PDU during a CIS subevent to indicate an intention to put the ACL link back into the dormant state. In one embodiment, instead of the central device 904, the peripheral device 902 may transmit the second CIS LL PDU indicating an intention to put the ACL link back into the dormant state.

In operation 926, the peripheral device 902 may transmit to the central device 904 an acknowledgement of the second CIS LL PDU via a CIS event. In one embodiment, if the second CIS LL PDU is not correctly received, the peripheral device 902 may transmit to the central device 904 a non-acknowledgement indication via a CIS event. In this case, the central device 904 may retransmit the second CIS LL PDU until an acknowledgement is received from the peripheral device 902.

In operation 928, the central device 904 and the peripheral device 902 may return the ACL link to the parked mode under the resume sub-mode. The ACL link may remain dormant without any further ACL events until it's activated by either device. In one embodiment, the two devices may return the ACL link to the park mode under the quick association sub-mode.

FIG. 10 illustrates a flow diagram of a method 1000 for a device in an isochronous link associated with a dormant ACL link to activate the ACL link from the dormant state for an ACL event with a specified timing in accordance with one aspect of the present disclosure. In one aspect, the 1000 may be performed by the host or the controller of a BLE system utilizing hardware, software, or combinations of hardware and software.

In operation 1001, a first device of a communication network configures an inactive state for a first link between the first device and a second device of the communication network. The first link is used for transporting asynchronous events. The first link shares airtime with a second link that is used for transporting isochronous events between the first device and the second device. In one embodiment, the first link is a BLE ACL link and the second link is an isochronous link for BLE CIS or BLE CIG.

In operation 1003, the first device transmits to the second device over the second link a control packet. The control packet indicates an intention of the first device to activate the first link.

In operation 1005, the first device receives from the second device over the second link an acknowledgement of the control packet.

In operation 1007, the first device communicates with the second device over an asynchronous event of the first link.

In operation 1009, the first device configures the first link back to the inactive state.

Various embodiments of the techniques for BLE devices to temporarily deactivate or activate the ACL link associated with an isochronous link between a central and a peripheral device of a BLE piconet to reduce chance of collisions between events on the isochronous link and on the ACL link described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device including an antenna, a radio frequency (RF) transceiver, a controller operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

Figure 11:
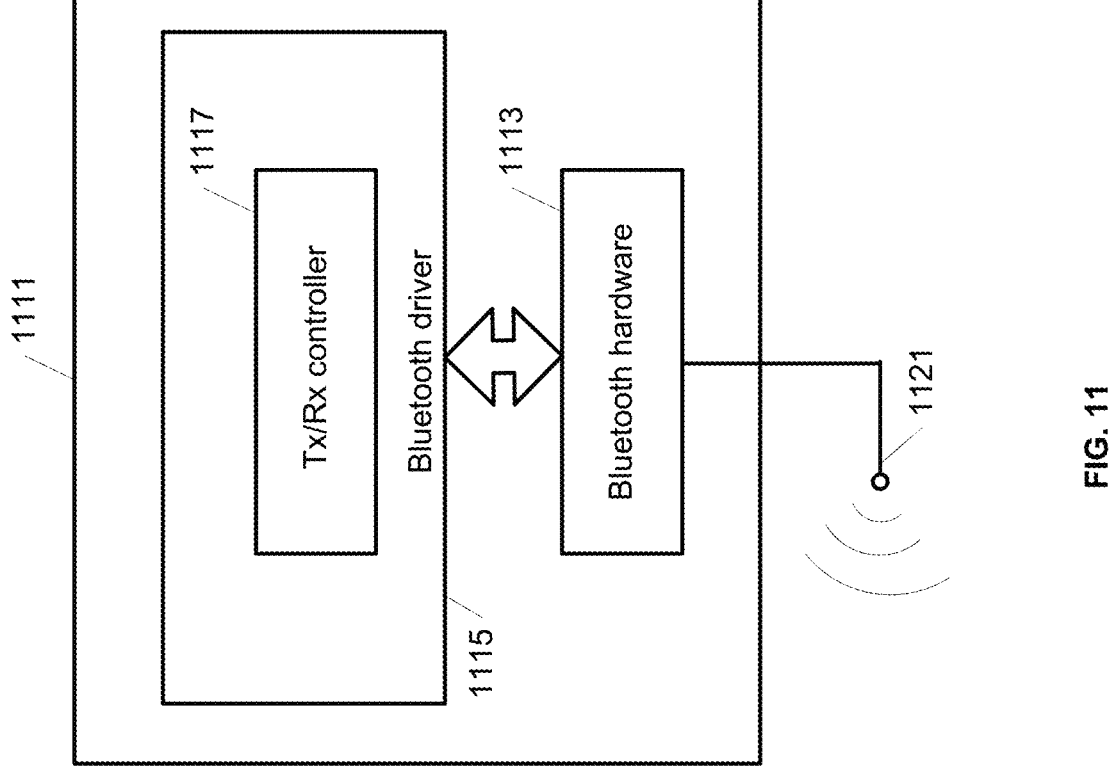
FIG. 11 depicts a block diagram of a Bluetooth device showing hardware and software drivers deployed to operate a BLE isochronous link to implement the activation of an ACL link from a dormant state or the deactivation of the ACL link back to the dormant state to reduce the chance of collisions between packets on the isochronous link and packets on the ACL link in accordance with one aspect of the present disclosure.

FIG. 11 depicts a block diagram of a Bluetooth device 1111 showing hardware and software drivers deployed to operate a BLE isochronous link to implement the activation of an ACL link from a dormant state or the deactivation of the ACL link back to the dormant state to reduce the chance of collisions between packets on the isochronous link and packets on the ACL link in accordance with one aspect of the present disclosure. The Bluetooth device 1111 may practice the protocol of FIGS. 3, 5-7 or the operations of FIGS. 8-10.

The Bluetooth device 1111 may include one or more antennas 1121, Bluetooth hardware 1113 and Bluetooth driver 1115. The Bluetooth driver 1115 may include Bluetooth Tx/RX controller 1117. The Bluetooth hardware 1113 may include a RF transceiver configured to transmit or receive CIS packets on isochronous channels, or to transmit or receive ACL packets on ACL channels through the antennas 1121. The Bluetooth Tx/RX controller 1117 may be configured to generate or decode protocol signaling to activate or deactivate the ACL link to avoid or reduce chances of collisions of ACL events with CIS events on the isochronous link as described herein.

In one embodiment, the Bluetooth device 1111 may include a memory and a processing device (e.g., Bluetooth Tx/RX controller 1117). The memory may be synchronous dynamic random access memory (DRAM), read-only memory (ROM)), or other types of memory, which may be configured to store the code to perform the function of the Bluetooth driver 1115. The processing device may be provided by one or more general-purpose processing devices such as a microprocessor, central processing unit, or the like. In an illustrative example, the processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for communication between a first device and a second device of a communication network, comprising:
configuring, by the first device, an inactive state for a first link between the first device and the second device, the first link configured to transport asynchronous events and share airtime with a second link that is configured to transport isochronous events between the first device and the second device;

transmitting, by the first device to the second device over the second link, a control packet, the control packet comprising a link layer control protocol data unit (PDU) that indicates an intention to activate the first link;

receiving, by the first device from the second device over the second link, an acknowledgement of the control packet;

communicating, by the first device with the second device, over an asynchronous event of the first link; and configuring, by the first device, the first link back to the inactive state.

2. The method of claim 1, wherein during the inactive state of the first link, the first device is refrained from communicating with the second device over the first link.

3. The method of claim 1, wherein configuring an inactive state for the first link comprises:

establishing, by the first device with the second device, the second link based on the first link being in an active state; and agreeing, between the first device and the second device, to refrain from transmitting over the first link after establishing the second link.

4. The method of claim 1, wherein transmitting the control packet over the second link comprises:

transmitting, by the first device to the second device, the control packet during an isochronous event of the second link, wherein the control packet includes timing information to indicate timing of the asynchronous event of the first link intended for communicating between the first device and the second device.

5. The method of claim 4, wherein the timing information comprises an offset of a start of the asynchronous event of the first link from an end of the isochronous event of the second link.

6. The method of claim 4, wherein communicating over the asynchronous event of the first link comprises:

scheduling, by the first device, the timing of the asynchronous event of the first link based on the timing information; and transmitting, by the first device to the second device, a packet over the first link during the asynchronous event.

7. The method of claim 4, further comprising:

determining, by the first device, the timing of the asynchronous event to avoid a collision between the asynchronous event of the first link and any isochronous events of the second link.

8. The method of claim 4, wherein communicating over the asynchronous event of the first link comprises:

scheduling, by the first device, periodic asynchronous events of the first link, wherein the timing of a first asynchronous event of the periodic asynchronous events is based on the timing information; and exchanging, between the first device to the second device, a plurality of packets over the first link during the periodic asynchronous events.

9. The method of claim 1, further comprising:

retransmitting, by the first device to the second device, the control packet over the second link when the first device fails to receive the acknowledgement of the control packet from the second device.

10. The method of claim 1, wherein configuring the first link back to the inactive state comprises:

transmitting, by the first device to the second device, a second control packet over the second link, the second control packet indicating an intention to deactivate the first link;

receiving, by the first device from the second device, an acknowledgement of the second control packet; and agreeing, between the first device and the second device, to refrain from transmitting over the first link.

11. The method of claim 1, wherein the communication network comprises a Bluetooth Low Energy (BLE) network, wherein the first device comprises a central device of the BLE wireless network, wherein the second devices comprises a peripheral device of the BLE wireless network, wherein the first link comprises a BLE asynchronous connection-oriented logical transport (ACL) link, and wherein the second link comprises an isochronous link for a BLE connected isochronous stream (CIS).

12. The method of claim 1, wherein the communication network comprises a Bluetooth Low Energy (BLE) network, wherein the first device comprises a peer device of the BLE wireless network, wherein the second devices comprises a central device of the BLE wireless network, wherein the first link comprises a BLE asynchronous connection-oriented logical transport (ACL) link, and wherein the second link comprises an isochronous link for a BLE connected isochronous stream (CIS).

13. An apparatus comprising:

a transceiver configured to transmit or receive packets over a first link and a second link with a peer device, the first link configured to transport asynchronous events, the second link configured to transport isochronous events, the first link and the second link sharing airtime;

a processing system configured to:

configure the transceiver to stop communication over the first link;

transmit to the peer device, via the transceiver, a control packet over the second link, the control packet comprising a link layer control protocol data unit (PDU) that indicates an intention to activate the first link;

receive from the peer, device via the transceiver, an acknowledgement of the control packet over the second link;

communicate with the peer device, via the transceiver, over an asynchronous event of the first link; and configure the transceiver to again stop communicating over the first link.

14. The apparatus of claim 13, wherein to transmit to the peer device the control packet over the second link, the processing system is configured to:

transmit to the peer device, via the transceiver, the control packet during an isochronous event of the second link, wherein the control packet includes timing information to indicate timing of the asynchronous event of the first link.

15. The apparatus of claim 14, wherein the timing information comprises an offset of a start of the asynchronous event of the first link from an end of the isochronous event of the second link.

16. The apparatus of claim 14, wherein to communicate with the peer device over an asynchronous event of the first link, the processing system is configured to:

schedule the timing of the asynchronous event of the first link based on the timing information; and transmit to the peer device, via the transceiver, a packet over the first link during the asynchronous event.

17. The apparatus of claim 14, wherein to communicate with the peer device over an asynchronous event of the first link, the processing system is configured to:

determine the timing of the asynchronous event to avoid a collision between the asynchronous event of the first link and any isochronous events of the second link.

18. The apparatus of claim 14, wherein to communicate with the peer device over an asynchronous event of the first link, the processing system is configured to:

schedule periodic asynchronous events of the first link, wherein the timing of a first asynchronous event of the periodic asynchronous events is based on the timing information; and exchange with the peer device, via the transceiver, a plurality of packets over the first link during the periodic asynchronous events.

19. The apparatus of claim 13, wherein to configure the transceiver to again stop communicating over the first link, the processing system is configured to:

transmit to the peer device, via the transceiver, a second control packet over the second link, the second control packet indicating an intention to deactivate the first link;

receive from the peer, device via the transceiver, an acknowledgement of the second control packet over the second link; and agree with the peer device to stop communicating over the first link.

20. The apparatus of claim 13, wherein the apparatus comprises a peer device of a Bluetooth Low Energy (BLE) wireless network, wherein the second devices comprises a central device of the BLE wireless network, wherein the first link comprises a BLE asynchronous connection-oriented logical transport (ACL) link, and wherein the second link comprises an isochronous link for a BLE connected isochronous stream (CIS).

\* \* \* \* \*